GEORGE B. BRYANT.
Improvement in Car Truck and Axles,

No. 120,488.   Patented Oct. 31, 1871.

UNITED STATES PATENT OFFICE.

GEORGE B. BRYANT, OF POTTSVILLE, PENNSYLVANIA.

IMPROVEMENT IN CAR-TRUCKS AND AXLES.

Specification forming part of Letters Patent No. 120,488, dated October 31, 1871.

*To all whom it may concern:*

Be it known that I, GEORGE B. BRYANT, of Pottsville, in the county of Schuylkill and State of Pennsylvania, have invented an Improved Car-Truck and Axle; and I do hereby declare the following to be a full, clear, and exact description of the same, reference being had to the accompanying drawing forming part of this specification.

Figure 1:
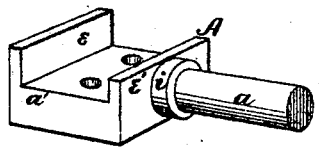
Figure 2:
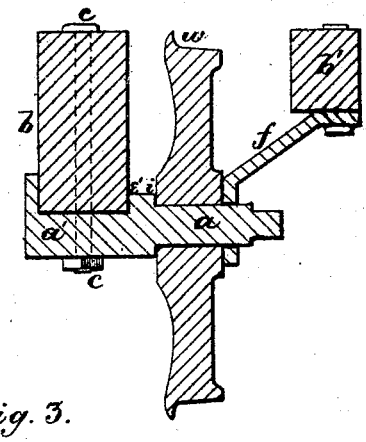
Figure 3:
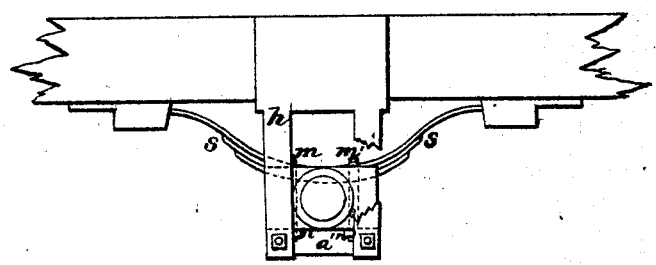

Figure 1 is a perspective view of the axle; Fig. 2, a vertical section of the truck and axle; Fig. 3, a side elevation of the truck and axle, showing the arrangement of a spring in connection with said parts; and Fig. 4, a bottom view of the parts represented in Fig. 3.

Similar letters of reference in the accompanying drawing denote the same parts.

This invention relates more particularly to that class of cars used about mines and other places where short curves are necessary, and therefore provided with wheels that revolve upon a fixed axle. The object of the invention is to simplify and cheapen the construction both of the truck and the axle pertaining to such cars; and to this end the invention consists in the form and method of securing the axle to the truck; and, secondly, to the combination with the axle of a truck adapted specifically to the proper support of an axle of this form, and to the proper support of the wheels running thereon, as hereinafter set forth.

Figure 4:
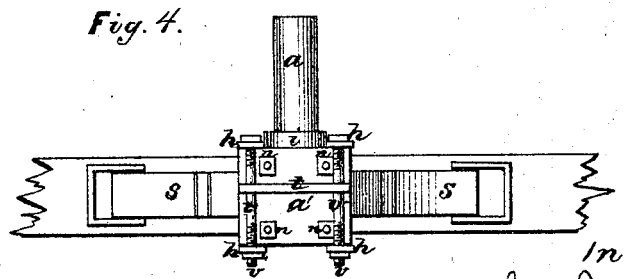

In the drawing, A is the cast-iron axle, constructed with a straight cylindrical journal, $a$, which projects from a flanged head or supporting-plate, $a'$, as shown. The truck is constructed with one very stout and strong beam, $b$, extending longitudinally of the car, just inside of the wheel $w$, and with another beam, $b'$, parallel to the first, outside of the wheel, and about half as large as the beam $b$. The upper surfaces of both beams are at the same level, but, from the difference in the size of beams, the under surface of the outer one is seven or eight inches, more or less, higher than that of the inner one, as clearly represented in Fig. 2. The part $a'$ of the axle is brought up against the under side of the beam $b$, with its flanges $e$ $e'$ closely fitting against the sides of the latter, and is secured firmly in that position by means of two or more bolts, $c$ $c$, which extend up through the plate and the beam, and are provided with suitable screw-nuts to tighten them up and keep them in place. A collar, $i$, cast upon the axle between the flange $e'$ and the journal $a$, holds the wheel at the proper distance from the beam $b$. The outer end of the axle is supported, and at the same time the wheel is kept upon it, by means of a bent brace, $f$, bolted to the under side of the beam $b'$, and provided with a vertical flange which bears against the outer side of the wheel, through which the journal projects, as shown. If the constructor desires to use springs to support the body of the car, as in case of street-cars and other light vehicles, to which the construction is applicable, he sets the middle of the spring $s$ upon the plate $a'$, as shown in Fig. 3, and straps it down by means of two staples or bent rods, $m$ $m'$, the ends of which extend down through the plate and are tightened and secured by screw-nuts $n$ $n$, as shown in Fig. 4. The axle thus attached to the spring is supported by means of plates $h$ $h$ affixed to the beam $b'$ and projecting downward for the purpose, the back of the plate $a'$ resting upon horizontal cross-bolts $v$ $v$, which connect the lower extremities of the lugs $r$ $r$, and also, if preferred, upon one or more bars, $t$, through which said cross-bolts extend. The ends of the springs inclining upward longitudinally of the car are affixed in any proper manner to its frame so as to bear the weight thereof.

Where a four-wheel truck is used, or where a four-wheel car is supported at the middle upon a spring, the spring, instead of being affixed to the upper side of the plate $a'$, between the flanges, may rest upon a bar extending from the end of one axle to the end of the other outside of both wheels. The axle will, in that case, be attached to the plate $b$ and its outer end supported by the bar $f$, as above described, and as shown in Fig. 2.

Having thus described my invention, what I claim as new therein, and desire to secure by Letters Patent, is—

The combination of the axle A, constructed as described and shown, with a car-truck having the large inner beam $b$ and the small outer beam $b'$, and with the bent supporting-bar $f$, all arranged as herein set forth.

GEORGE B. BRYANT.

Witnesses:
N. K. ELLSWORTH,
E. F. BROWN.